L. E. L. THEMKE.
SPRING WHEEL.
APPLICATION FILED SEPT. 5, 1906.
916,059.
Patented Mar. 23, 1909.
2 SHEETS—SHEET 1.
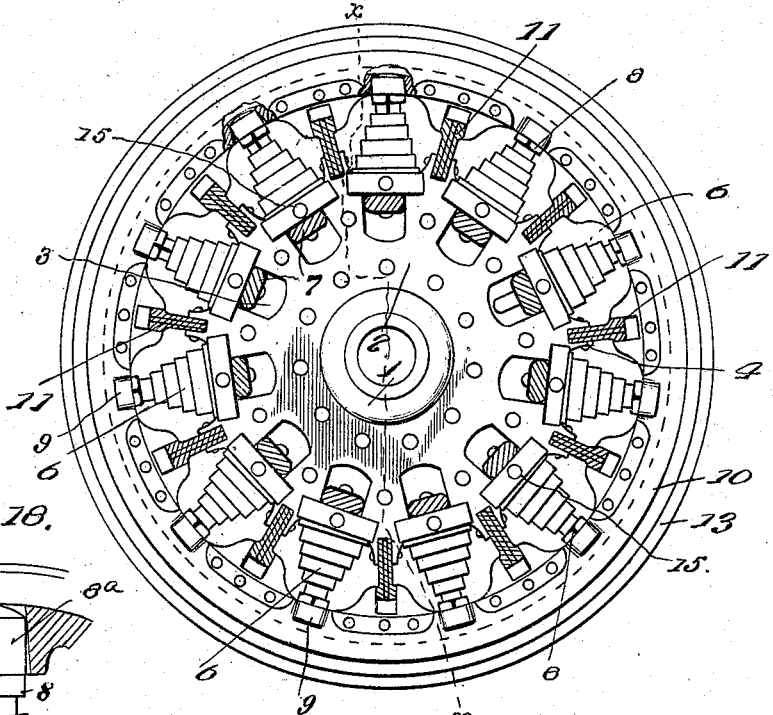
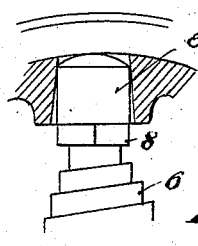
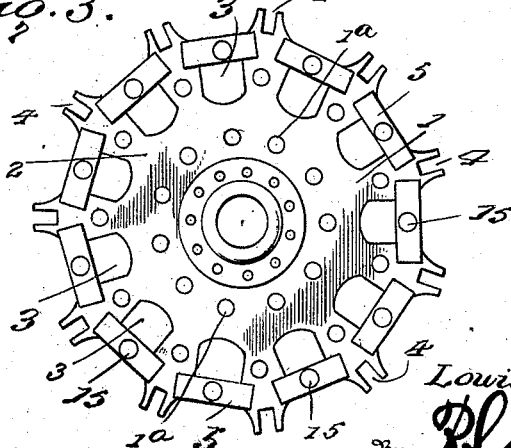
Witnesses
Inventor
Louis E. L. Themke
By R. S. & A. B. Lacey,
Attorneys

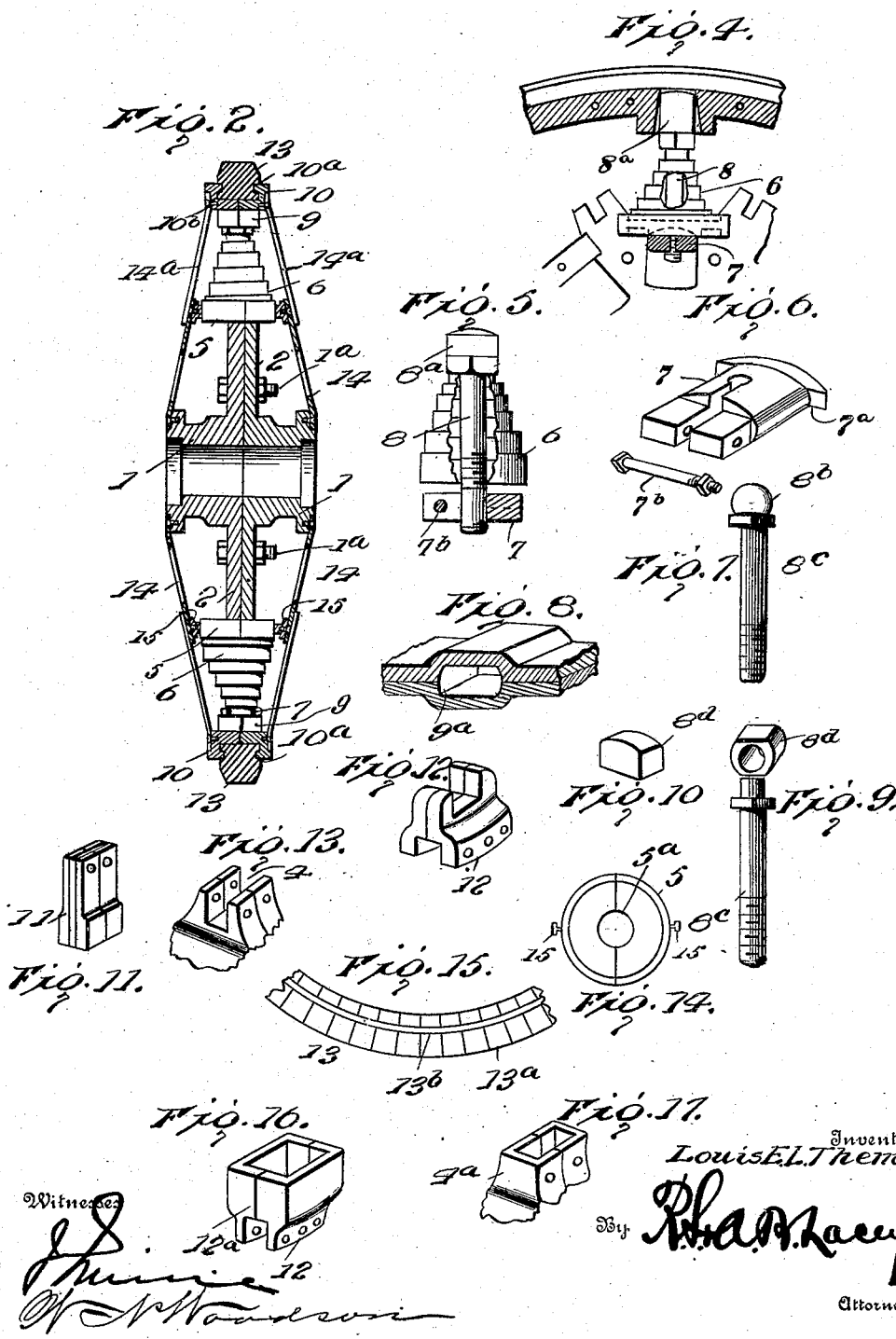

UNITED STATES PATENT OFFICE.

LOUIS E. L. THEMKE, OF STRATHCONA, ALBERTA, CANADA.

SPRING-WHEEL.

No. 916,059.	Specification of Letters Patent.	Patented March 23, 1909.

Application filed September 5, 1906. Serial No. 333,405.

*To all whom it may concern:*

Be it known that I, LOUIS E. L. THEMKE, subject of the King of England, residing at Strathcona, Province of Alberta, Dominion of Canada, have invented certain new and useful Improvements in Spring-Wheels, of which the following is a specification.

This invention contemplates certain new and useful improvements in spring wheels, and the primary object of the invention is to provide a wheel of this character which will embody the characteristics of extreme resiliency, durability, comparative simplicity in construction, strength and lightness, and ease of manufacture and in the assembling of the parts.

With this and other objects in view, as will more fully appear as the description proceeds, the invention consists in certain constructions, arrangements, and combinations of the parts hereinafter described and particularly pointed out in the appended claims.

For a full description of the invention and the merits thereof and also to acquire a knowledge of the details of construction of the means for effecting the result, reference is to be had to the following description and accompanying drawings, in which:

Figure 1 is a side elevation of my improved spring wheel, the side plates at one side of the wheel being removed or omitted to disclose the interior parts. Fig. 2 is a transverse section of the wheel complete, the section being taken approximately on the line $x$—$x$ of Fig. 1. Fig. 3 is a side elevation of the hub portion of the wheel detached from the rim thereof. Fig. 4 is a detail side elevation of a portion of the wheel. Fig. 5 is a detail view of one of the spiral springs employed and one form of bolt to be used in connection therewith, the spring being broken away to show the bolt inside of it, and the nut for the bolt being sectioned. Fig. 6 is a detail perspective view of one of the nuts designed to screw on the spring inclosed bolts. Fig. 7 is a detail view of another form of bolt which may be employed in connection with the spiral springs. Figs. 8, 9 and 10 illustrate in detail parts combining to produce a modified construction of bolt for the spiral springs and socket pieces for the head of said bolt. Fig. 11 is a detail perspective view of one of the sets of leaf springs employed between every two spiral springs. Figs. 12 and 13 are detail perspective views illustrating the socket pieces for the respective ends of said leaf springs. Fig. 14 is a detail view of one of the cups designed for the reception of the base of the spiral springs employed. Fig. 15 is a detail side elevation illustrating a modified form of tire that may be used. Figs. 16 and 17 are detail fragmentary perspective views of modifications of the socket pieces illustrated in Figs. 12 and 13. Fig. 18 is an enlarged detail view illustrating the socket which receives the head of the spring adjusting bolt.

Corresponding and like parts are referred to in the following description and indicated in all the views of the drawings by the same reference characters.

The hub of my improved wheel, illustrated in Figs. 1, 2 and 3, is, as best shown in Fig. 2, constructed in two mating sections 1 designed to abut side by side and secured together by a circular series of bolts $1^a$. Each hub section is provided with an annular flange 2 through which the said fastening bolts extend and the two flanges 2 are together formed at their rim edges or margins with a circular series of radially extending sockets 3, and with radial recesses 4 between every two sockets and beyond said sockets as shown. Rigidly secured in notches cut in the margin of the flanges of the hub, is a series of radially facing cups 5, which as shown best in Fig. 14 are divided in halves in the manufacture, so that they may be integrally formed with the two hub sections.

Spiral and preferably flat springs 6 are arranged with their bases fitting snugly within the cups 5, and these springs are true spirals with their convolutions slightly overlapping so that when compressed one coil will slide within the next largest coil. The spiral springs 6 are held securely in place in their respective cups 5 by means of bolts the heads of which are preferably located at the apices of the springs and whose shanks extend centrally through the springs and are inclosed thereby, the threaded ends of the bolts extending through apertures $5^a$ in the cups and beyond the bottoms of the cups into the sockets 3. One form of these bolts is illustrated in detail in Fig. 5, where the spring is broken away partially to show the formation of the bolts. To secure the bolts and consequently the springs properly in place, I have provided a peculiar form of nut, designated 7 which is threaded to work on the threaded end of the bolt such as that indicated at 8 in Fig. 5, and these nuts 7 are provided with shoulders 7$^a$ to engage the walls of the sockets in which they are located and they are provided with small tightening or clamping bolts 7$^b$ by which they may be securely locked on the spring retaining bolts after the desired adjustment has been effected. That form of bolt indicated at 8 and shown in Figs. 1 and 5, is provided with a rounded head 8$^a$ fitting within a socket 9 facing inwardly or centrally from the inner face of the rim 10 of the wheel. The rim 10 is, like the hub 1, constructed in two halves as are the sockets 9, one half of each socket being preferably formed integrally with its respective rim section. It is to be understood that a series of these sockets 9 is provided, one for each spiral spring 6, and the bolt thereof.

As illustrated in Fig. 7, the head 8$^b$ of the bolt 8$^c$ may be substantially spherical in shape and it is to be understood that the socket in such event for the reception of the bolt is correspondingly formed so that play to a certain extent may be permitted. Or, as illustrated in Figs. 8, 9 and 10, the sockets there designated 9$^a$ may be oblong as shown, while the bolt 8$^c$ may be provided with a neck on which an oblong head 8$^d$ is mounted to turn, the said head conforming to the socket in which it is to be received. In each of these modifications of the bolt for retaining the spiral springs in place and the socket for receiving the head of the bolt, the construction provides for a circular movement of the bolt with respect to the socket, but prevents any lateral strain beyond that which is permitted according to the principles of good mechanics and for the purpose of avoiding undue strain. But with the exception of this slight lateral play all lateral movement is avoided so that a rigid structure of wheel is produced from which side strain is precluded to the greatest possible extent.

Sets of leaf springs 11, one set of which is illustrated in detail in Fig. 11, are arranged in a plurality of layers with one end received in the recesses 4 of the hub and with their other ends received within recessed brackets 12 which are secured to and extend inwardly from the inner edge of the rim 10 and are riveted to opposite sides of the rim so as to hold the two sections of the rim together in addition to their function of receiving the outer ends of the leaf springs 11. The recesses of these brackets 12 are in radial alinement manifestly, with the recesses 4 of the hub. The inner ends of these sets of leaf springs 11 are as shown, riveted within the recesses 4, but the outer ends of the springs which are slightly thickened, as shown, merely rest snugly within the recesses of the brackets 12 and are permitted to have a slight sliding movement therein. In the actual operation of the wheel, these sets of leaf springs 11 have no substantial effect in the resiliency of the wheel in a radial direction as they merely slide in the recesses of the brackets 12; but in the circumferential direction, it is obvious that they will yield slightly when power is imparted to the shaft or axle in the hub 1 and consequently the power will be transmitted from the hub to the rim of the wheel in a yielding manner without any undue shock and a steady pull will be imparted without any jarring sensation which is so apparent in automobile and other vehicle wheels as now constructed.

As has been before stated, the rim 10 is constructed in two sections. This is primarily done so that the tire 13 may be securely held in place by clamping it or embracing it between the two rim sections. The tire is formed on opposite sides with grooves to receive the inwardly projecting lips 10$^a$ of the rim sections and the said sections are also provided on their outer sides with annular recesses 10$^b$ in which the outer edges of the ring-like or annular casing plates 14$^a$ rest and are secured by screws of any desired fastening means. The hub sections of the inclosing casing are designated 14 and are secured by screws or similar fastening devices at their innermost edges in annular grooves in the outer faces or ends of the hub sections 1. The outer edges of the hub sections 14 of the casing are secured by screws or the like in diametrically opposite bosses 15 projecting from and preferably integral with the cups 5 accommodating the bases of the springs 6. The inner edges of the outermost sections 14$^a$ of the casing overlap the outermost edges of the sections 14 but the two overlapping edges are not secured together in any way except by frictional engagement although this engagement is such as to effectually prevent water and dust from gaining access to the interior of the wheel.

While I have shown in the main views of the drawings, the tire 13 as a solid or cushion tire, in contradistinction to a pneumatic tire, it is obvious that any form of tire may be used on my improved wheel, as the resiliency is not accomplished through the instrumentality of the tire but by the construction of the wheel itself with its series of spiral springs to secure radial compression and expansion and with its series of flat or plate springs 11 to secure the requisite circumferential relative movement between the wheel and the hub thereof. For instance, the tire may be constructed of sections of compressed paper 13$^a$ as indicated in Fig. 15, said sections being there shown as secured together by a clamp or clamping wires 13ᵇ; or, it is within the purview of my invention to make the tire of any material whatever, whether it be resilient or non-resilient of itself.

From the foregoing description in connection with the accompanying drawings, it will be seen that I have provided an improved and efficient form and construction of vehicle wheel which will possess resilience and at the same time simplicity of construction and durability.

In the preferred manner of assembling the parts of the wheel, the two hub sections are secured rigidly together with their cup sections alining. The spiral springs 6 are then put in place and the bolts of said springs are tightened up to compress the springs beyond the normal tension, the bolts being screwed into the nuts for this purpose. The leaf springs 11 are then riveted or otherwise secured in place in the recesses 4 of the hub, and the rim 10, preferably with the tire in it and with the two sections secured together, is then placed over the hub, the outer ends of the leaf springs 11 being snugly received within the recesses of the brackets 12. It then only remains to relieve the undue tension of the spiral springs 6 whereupon, as is manifest, the spiral springs will expand radially and the heads of their retaining bolts will fit snugly within their corresponding sockets 9 and the casing constituted by the rings 13 and 14 may then be secured in place to inclose the interior parts of the wheel.

As illustrated in Figs. 16 and 17, the recesses 4 may be bounded on all four sides by the metal of the hub plates, as indicated at 4ᵃ, and the brackets 12 may also be provided with side walls 12ᵃ bounding their recesses on both sides, so as to form in effect boxes for the respective ends of the flat or plate springs 11. Such a construction would materially assist in holding the rim of the wheel in the secured position as against lateral strain and movement. Furthermore, by this construction, the strain which would otherwise be imposed upon the rivets connecting the springs 11 in place, would be avoided or at least considerably reduced, and by having the opposite ends of said springs set in a box and mounted to slide therein, the possibility of bending the bolts or rivets from the jars to which the wheel is exposed in a lateral direction, will be taken away.

Having thus described the invention, what is claimed as new is:

1. In a vehicle wheel, the combination of a hub, a rim encircling said hub, the hub being provided with a series of radially facing sockets, a series of spirally coiled flat springs interposed between said hub and rim, and a series of adjusting bolts for the springs, said bolts being in engagement with the rim and being accommodated at one end in the said recesses, and nuts arranged to adjust the bolts in said recesses for the purpose of varying the tension of said springs.

2. In a vehicle wheel, the combination of a hub provided with a series of radially facing sockets and a series of radially facing recesses between the sockets, a series of spiral springs interposed between the hub and the rim, bolts extending through the spiral springs, said bolts engaging the rim and being provided with adjusting devices within the said sockets, and leaf springs secured in the recesses of the hub and engaging the rim.

3. In a vehicle wheel, the combination of a hub provided with a series of radially facing sockets and a series of radially facing recesses between the sockets, a series of spiral springs interposed between the hub and the rim, bolts extending through the spiral springs, said bolts engaging the rim and being provided with adjusting devices within the said sockets, and leaf springs secured in the recesses and having a radially sliding engagement with the rim.

4. In a vehicle wheel, the combination of a hub, a rim encircling said hub and provided with a series of brackets, said brackets being formed with centrally facing recesses, a series of radially expansible springs interposed between said hub and rim, and a series of circumferentially yielding springs secured to said hub, with their ends mounted to slide in the recesses of said brackets.

5. In a vehicle wheel, the combination of a hub, a rim encircling said hub and provided with a series of brackets, said brackets being formed with centrally facing recesses, a series of radially expansible springs interposed between said hub and rim, and a series of circumferentially yielding springs secured to said hub, with their ends mounted to slide in the recesses of said brackets, said rim being constructed in sections and the brackets embracing said sections and fastened thereto whereby to secure the two sections of the rim together.

6. In a vehicle wheel, the combination of a hub, a rim encircling said hub, said rim being provided with a series of inwardly facing sockets, and the hub being provided with radially and outwardly facing cups in alinement with the respective sockets of the rim, spiral springs mounted with their bases seated in the cups, and bolts having heads mounted in sockets of the rim and extending through the spiral springs, through and beyond the bottoms of the nuts and provided on their projecting ends with adjusting means, for the purpose specified.

7. In a vehicle wheel, the combination of a hub, provided with a series of outwardly facing cups, the cups being formed at diametrically opposite sides with bosses, a rim encircling said hub, expansible springs seated in said cups and engaging the rim, and a sectional casing consisting of two ring-like sections, the inner ones of which are secured to the hub and to the bosses of the cups, and the outer ones of which are secured to the rim with their inner edges overlapping and having a sliding engagement with the meeting edges of the innermost sections.

In testimony whereof I affix my signature in presence of two witnesses.

LOUIS E. L. THEMKE. [L. S.]

Witnesses:
BERTHA B. JONES,
EDWARD MARTIN.